United States Patent
Merino Casajuana

(10) Patent No.: US 9,873,563 B2
(45) Date of Patent: Jan. 23, 2018

(54) TOOL FOR FASTENING A ROLLER-WAY TO A FRAME OF A MERCHANDISE CONVEYANCE FACILITY, AND CONVEYOR SYSTEM INCLUDING A PLURALITY OF SAID TOOLS

(71) Applicant: DINALAGER, S.L., Sentmenat (ES)

(72) Inventor: Carles Merino Casajuana, Sant Quirze del Vallès (ES)

(73) Assignee: DINALAGER, S.L., Sentmenat (ES)

( * ) Notice: Subject to any disclaimer, the term of this patent is extended or adjusted under 35 U.S.C. 154(b) by 0 days.

(21) Appl. No.: 15/032,204

(22) PCT Filed: Nov. 11, 2014

(86) PCT No.: PCT/ES2014/070832
§ 371 (c)(1),
(2) Date: Jul. 13, 2016

(87) PCT Pub. No.: WO2015/071514
PCT Pub. Date: May 21, 2015

(65) Prior Publication Data
US 2016/0318712 A1 Nov. 3, 2016

(30) Foreign Application Priority Data
Nov. 12, 2013 (ES) ............... 201331301 U

(51) Int. Cl.
*B65G 13/11* (2006.01)
*B65G 1/02* (2006.01)
*B65G 39/12* (2006.01)

(52) U.S. Cl.
CPC ............. *B65G 13/11* (2013.01); *B65G 1/023* (2013.01); *B65G 39/12* (2013.01)

(58) Field of Classification Search
CPC ........ B65G 1/023; B65G 39/12; B65G 13/11; B65G 13/12
See application file for complete search history.

(56) References Cited

U.S. PATENT DOCUMENTS 5,779,064 A * 7/1998 Dolling ................ A47B 47/021
 211/151
6,102,185 A * 8/2000 Neuwirth ............... B65G 1/023
 193/35 R (Continued)

FOREIGN PATENT DOCUMENTS

EP 2128046 A1 12/2009

OTHER PUBLICATIONS

Papatheofrastou, M., "International Search Report," prepared for PCT/ES2014/070832, dated Feb. 20, 2015, three pages.

*Primary Examiner* — Mark A Deuble
(74) *Attorney, Agent, or Firm* — Winstead PC

(57) ABSTRACT

Utensil (1) for securing a roller (4a) track (4) to a frame structure of a goods conveyor installation, which comprises means (2,11a,11b,12a,12b) for fastening one end (3) of said track (4), and a base (5) for holding said fastening means (2,11a,11b,12a,12b), that is characterized in that it comprises a clamp (7) for securing said holding base (5) to the aforesaid structure, said clamp (7) being capable of surrounding said structure in order to secure said holding base (5) when said holding base (5) leans on the structure. The utensil presents the advantage of adapting to any size of the structure of the frame on which the track is supported.

15 Claims, 6 Drawing Sheets

(56) References Cited

U.S. PATENT DOCUMENTS

| | | | | |
|---|---|---|---|---|
| 6,132,158 | A * | 10/2000 | Pfeiffer | B65G 13/12 193/35 R |
| 6,431,808 | B1 * | 8/2002 | Lowrey | B65G 1/023 193/35 R |
| 6,641,352 | B2 * | 11/2003 | Pfeiffer | B65G 13/12 193/35 A |
| 9,016,482 | B2 * | 4/2015 | Kim | A47F 1/126 211/59.2 |
| 2002/0064441 | A1 * | 5/2002 | Lowrey | B65G 1/023 414/276 |
| 2002/0112937 | A1 * | 8/2002 | Lutz | B62B 3/02 193/37 |
| 2004/0042879 | A1 | 3/2004 | Weaver | |
| 2004/0200688 | A1 | 10/2004 | Sorgi | |
| 2006/0037832 | A1 * | 2/2006 | Lawless | B65G 1/023 193/35 R |
| 2006/0108306 | A1 * | 5/2006 | Minchey | B65G 1/023 211/175 |

* cited by examiner

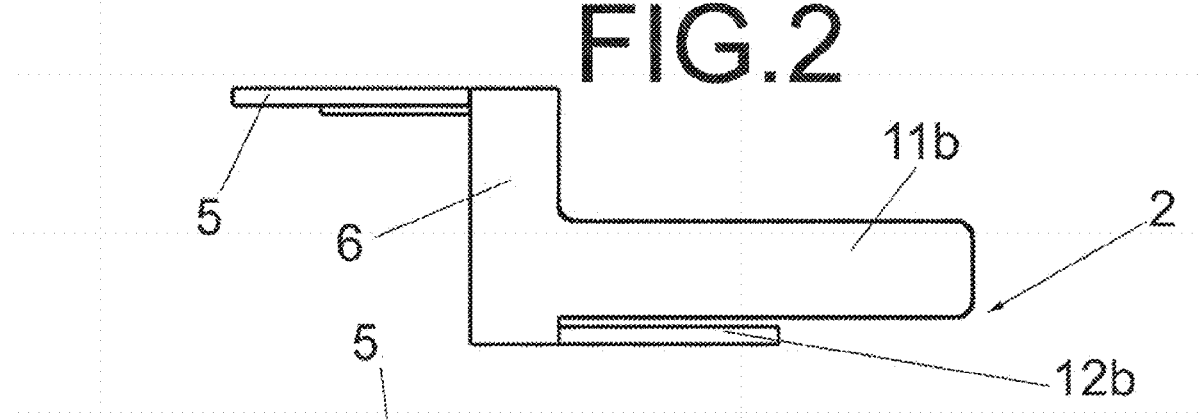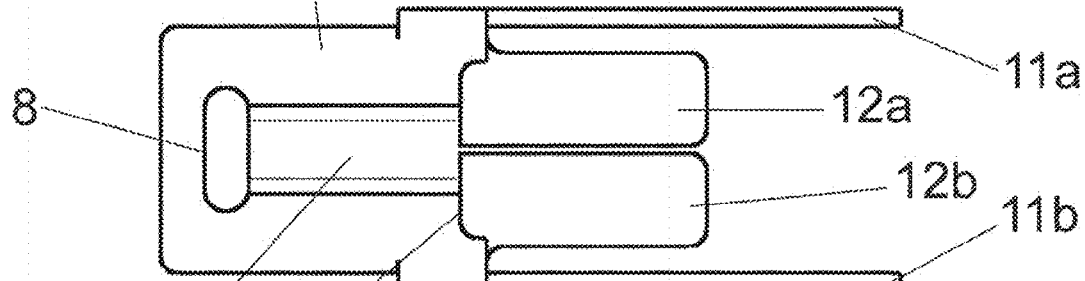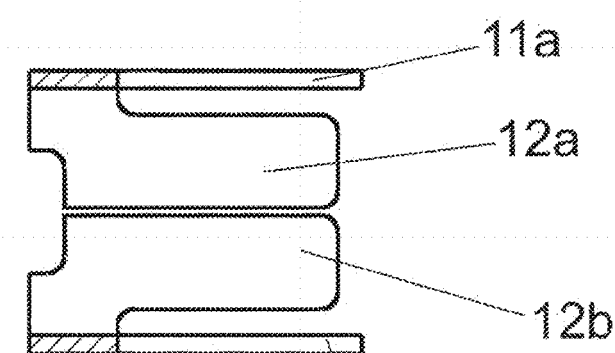

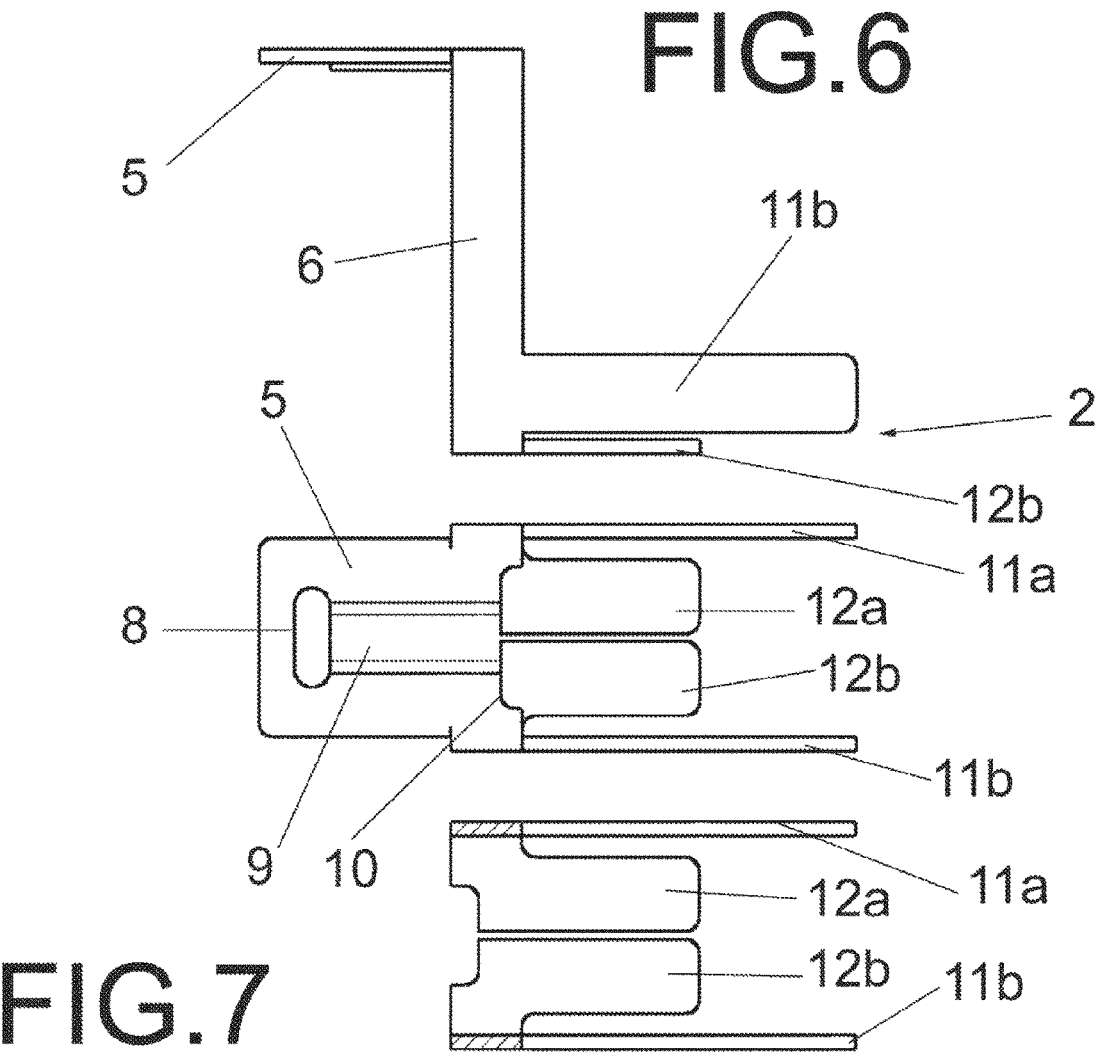

TOOL FOR FASTENING A ROLLER-WAY TO A FRAME OF A MERCHANDISE CONVEYANCE FACILITY, AND CONVEYOR SYSTEM INCLUDING A PLURALITY OF SAID TOOLS

The present invention relates to a utensil for securing a roller track to the frame of a conveyor installation which includes a gravity system for moving goods, such as for example, a system known in the industry by the name of "roller conveyor system or flow track transport system". It also relates to a roller conveyor system including a plurality of said utensils.

BACKGROUND OF THE INVENTION

Roller tracks are normally used in industry to move goods or light packages by gravity along shelving or work surfaces on which a plurality of said tracks have been previously assembled. This type of conveyor system is known in the industry by the name "roller conveyor system or flow track transport system".

The aforesaid roller tracks comprise a profile that is usually made of galvanised sheet metal or aluminium, substantially shaped like a "U", wherein the side walls present a plurality of holes for receiving the roller axles.

In the market there are utensils for securing roller tracks which incorporate a part for fastening each end of the track and a support profile in the shape of a hook for hanging each fastening part of the structure on the frame on which the tracks are assembled.

The utensils known to date present the drawback that the size of the profile that defines the hook must be adapted to the size of the structure on which said hook-shaped profile is hung. Otherwise, it would not be possible to guarantee correct support of the track. Therefore, for example, if the track is to be fastened to a crossbar that is 28 mm wide, the profile that defines the hook and that rests on said cross-bar must necessarily have a width of more than 28 mm to guarantee that it is correctly supported. Also, this hook-shaped profile must be fixed with screws or equivalent elements to the crossbar of the frame.

DESCRIPTION OF THE INVENTION

The purpose of the present invention is to resolve the aforementioned drawbacks by developing a utensil for securing a roller track to a frame of a conveyor installation, which presents the advantage of adapting to any size of the structure of the frame on which the track is supported.

In line with this objective, according to a first aspect, the present invention provides a utensil for securing a roller track to a frame of a goods conveyor installation, which comprises means for fastening one end of said track, and a base for holding said fastening means, and is characterised in that it comprises a clamp for securing the holding base on the aforesaid structure, said clamp being capable of surrounding said structure to secure said holding base when said holding base leans on the structure.

The claimed utensil presents the advantage of including a clamp for securing the holding base of the part that fastens the track. This clamp adapts to any size of the structure on which the track is assembled, forming a larger or smaller loop to secure the holding base of the track.

Preferably, said clamp is a self-adhesive tape or strip, such as for example, a tape with a Velcro®-type fastening system.

Nonetheless, the same clamp can be a tape or strip of plastic, such as for example a standard type nylon clamp.

According to a preferred embodiment, the utensil comprises a fastening part configured by way of a claw to fasten one end of said track, and a plate for holding said fastening part, said clamp being capable of surrounding said structure to secure said plate when said plate leans on the structure.

This embodiment provides a very practical utensil wherein the part that fastens the end of the track hangs from a plate that is secured on the structure of the frame. This holding plate is secured to the structure of the frame by means of a clamp which surrounds the structure and the plate itself forming a loop that adapts to the size of the structure.

Preferably, said track comprises a "U"-shaped profile for supporting the conveyor rollers, and said fastening part is configured by way of a claw to fasten the base of one end of said profile.

This claw-shaped part facilitates quick assembly of the utensil. Furthermore, the claw provides a base for supporting and fastening the track which is reliable and which does not occupy much space.

Advantageously, said track comprises a "U"-shaped profile for supporting the conveyor rollers, and said fastening part comprises a fork for insertion by pressure inside said profile, allowing the arms of said fork to be held to the side walls of one end of said profile.

This fork presents the advantage of allowing the track to be fasten by the interior part of the profile, which helps to have tracks adjacent to each other with their side profiles in contact. In this way, unlike what happens with other utensils in the state of the art, the tracks can be situated alongside each other without creating empty spaces between them, maximising the points of contact of the element to be conveyed. This becomes particularly interesting when wishing to create a goods reception "bay" by means of a plurality of tracks disposed adjacent to each other.

Preferably, said holding plate comprises a hole for tying said clamp and, advantageously, the upper face of said holding plate comprises a channel groove to house the clamp when said clamp surrounds the plate, and a notch provided on the edge of said plate for receiving said clamp.

This groove and the notch provide a housing for passage of the clamp which reduces or avoids wear through friction of the clamp with the holding plate.

According to the same preferred embodiment, said fastening part hangs from the holding plate through two support arms, said clamp being capable of passing between said arms to surround said structure and secure the plate.

As the fastening part is suspended from the plate by means of said support arms, the clamp can pass between the arms to envelop the structure and form the fastening loop.

Optionally, said support arms are configured with a predetermined length to act as a stopper for the goods at one exit end of said track.

This option is appropriate when the utensil is used to fasten one end of goods exit from the track, for example, the final end of a downwards goods ramp.

According to a second aspect, the present invention relates to a roller conveyor system for a installation for conveying light goods or loads by gravity comprising a plurality of cantilever roller tracks secured on a frame structure of said conveyor installation, and a plurality of the claimed utensils, wherein each end of the roller tracks is secured to a crossbar of said frame structure by way of one of said utensils.

In the present invention, conveyor installation is understood to mean a conveyor installation which uses roller tracks to move light goods or loads by gravity. The structure of the frame of said installation on which each end of the track is secured can be, for example, a crossbar of a shelf especially configured for installing cantilever roller tracks for conveying light goods or loads.

BRIEF DESCRIPTION OF THE DRAWINGS

For a better understanding of what has been set out above a set of drawings is attached which, schematically and by way of a non-limiting example only, represent a practical case of embodiment.

FIG. 2 is a side view of the utensil of FIG. 1.

FIG. 3 is a top view of the utensil of FIG. 1.

FIG. 4 is a cross-section of the utensil of FIG. 1.

FIG. 6 is a side view of the utensil of FIG. 5.

FIG. 7 is a top view of the utensil of FIG. 5.

FIG. 8 is a cross-section of the utensil of FIG. 5.

DESCRIPTION OF A PREFERRED EMBODIMENT

Figure 1:
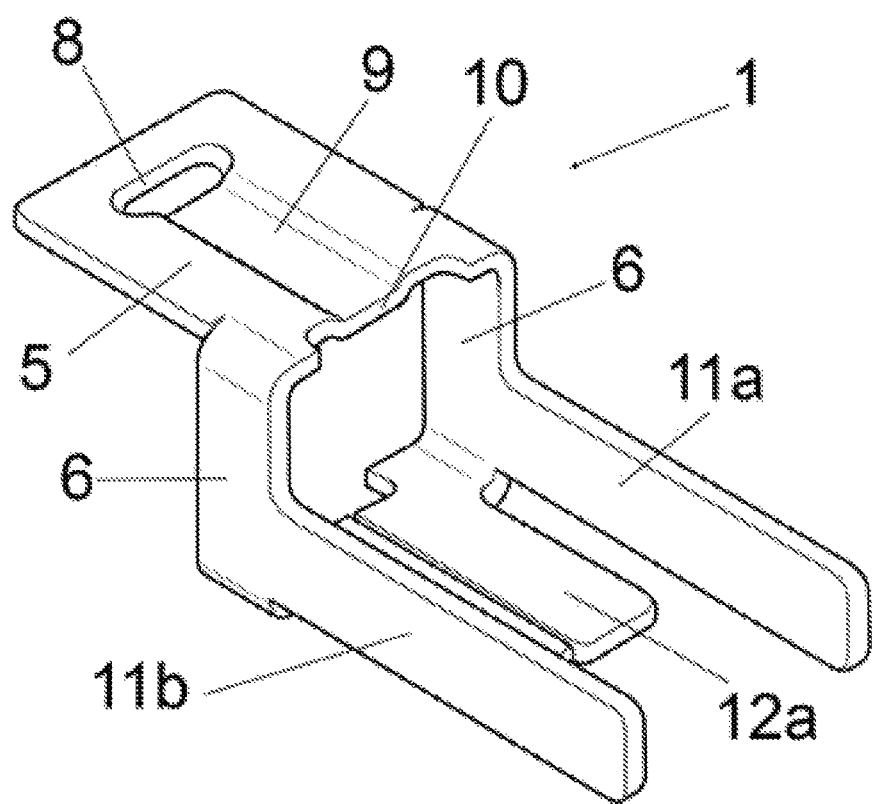
FIG. 1 shows a view in perspective of a utensil for holding the entry end of a goods track.
Figure 5:
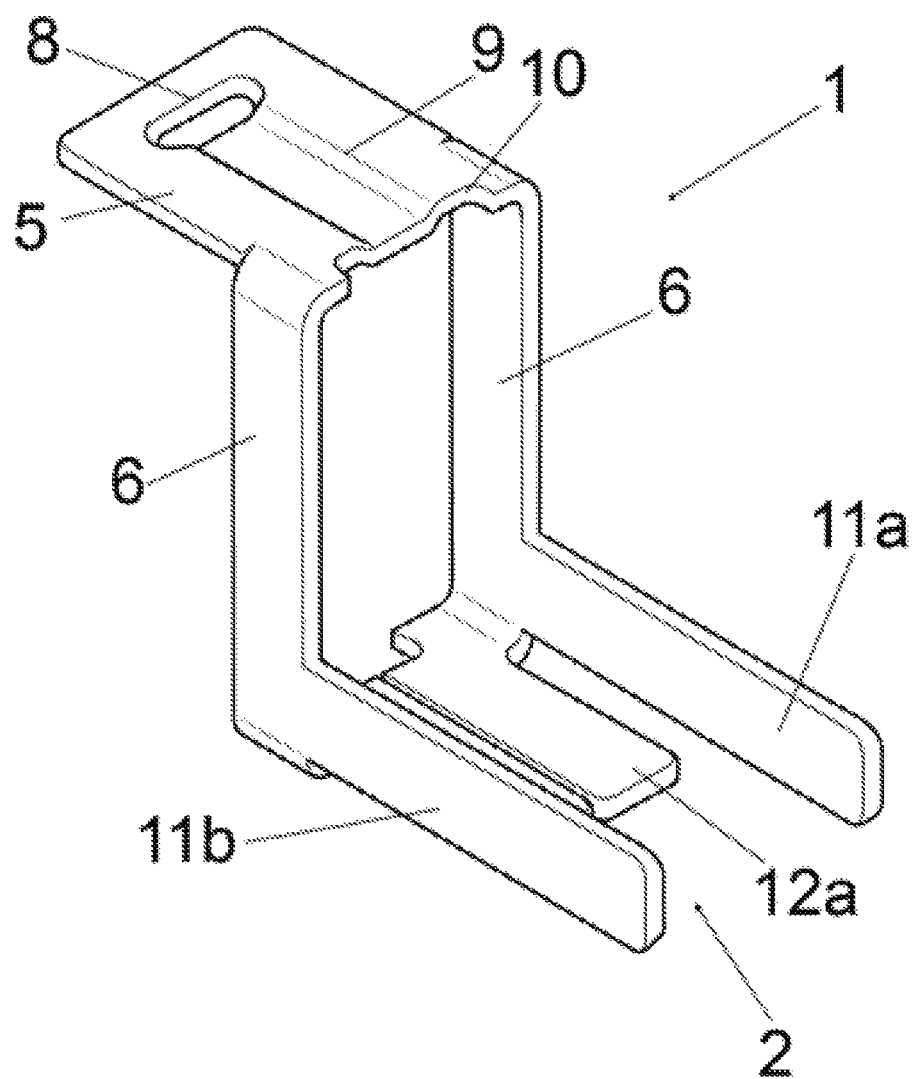
FIG. 5 shows a view in perspective of a utensil of securing the exit end of a goods track.

What follows is a description of an embodiment of the utensil making reference to FIGS. 1 to 10. This utensil is appropriate for securing the ends of a roller track to the structure of a frame of a light loads transport installation.

The utensil 1 represented in FIGS. 1 to 10 comprises a part 2 configured in the form of a claw or a clip for fastening one end 3 of a roller 4a track 4, a plate 5 for holding the fastening part 2 and two support arms 6 of said fastening part 2 which hang from the holding plate 5 when said holding plate 5 leans on a structure (not shown).

The utensil 1 is characterised in that it comprises a clamp 7 for securing the aforesaid holding plate 5 to the structure of the frame. This structure can be, for example, the crossbar of a shelf on which the tracks 4 are assembled in a cantilever formation.

Figure 9:
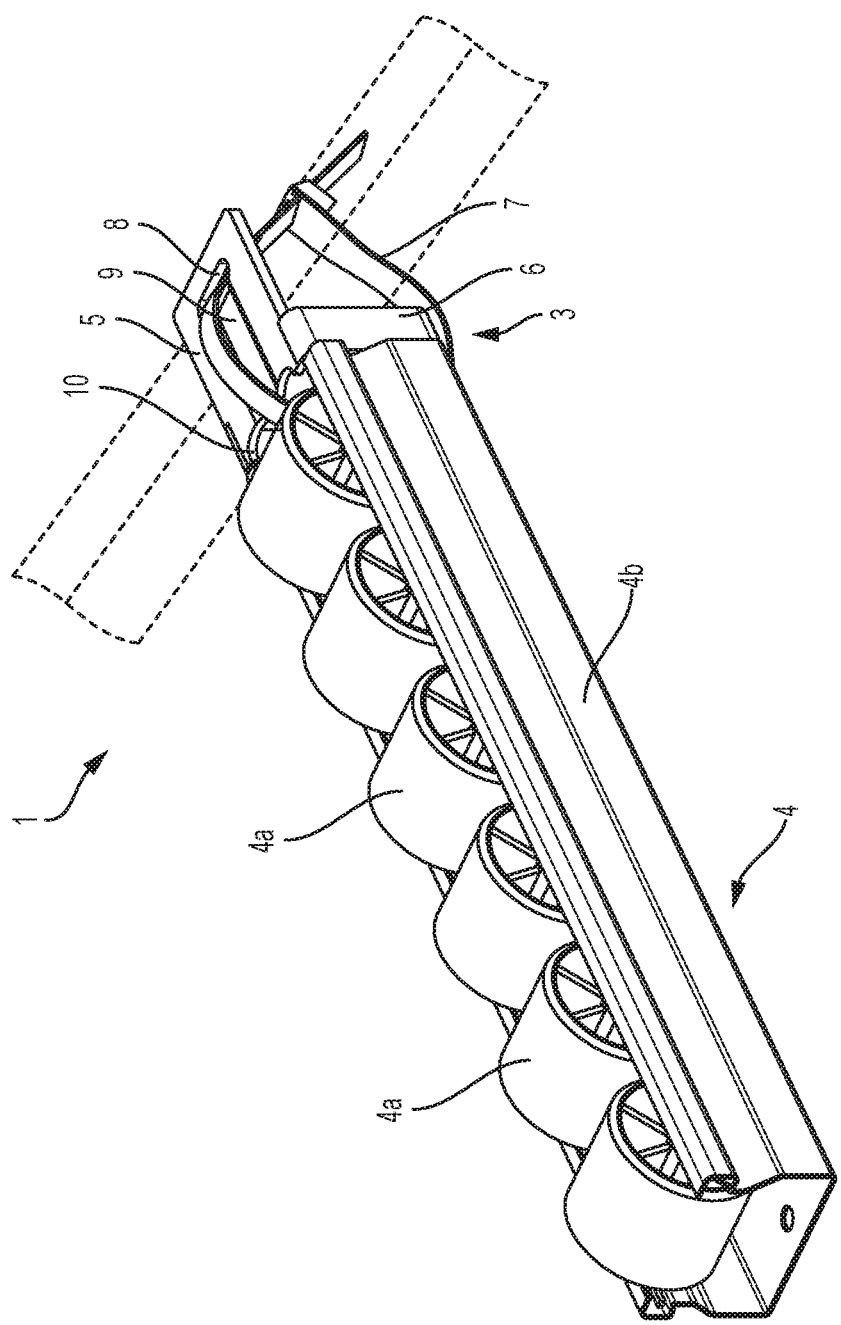
FIGS. 9 and 10 show roller tracks each incorporating respectively, the securing utensil according to FIGS. 1 and 5.
Figure 10:
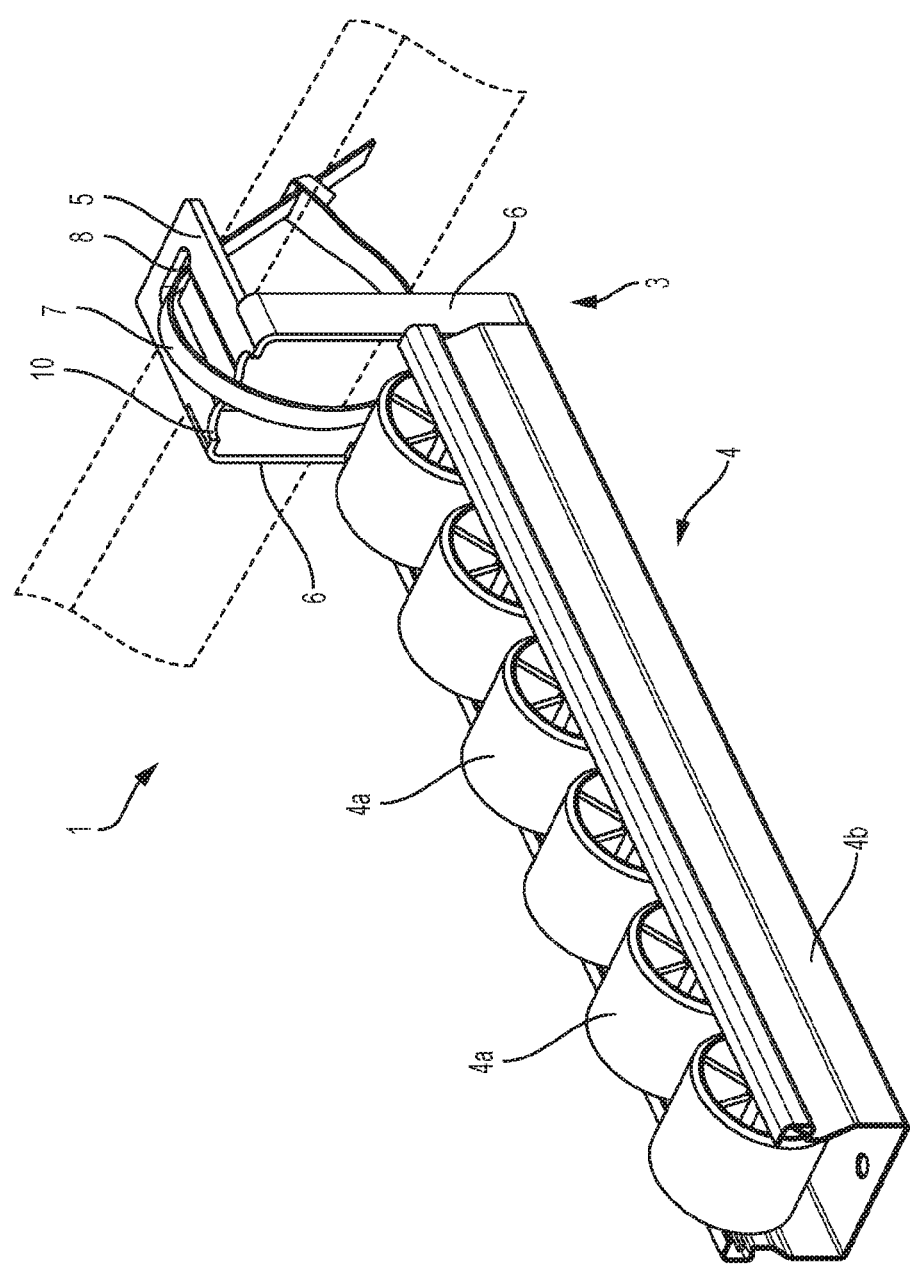

As mentioned in the description of the invention, the clamp 7 presents the advantage of being able to surround the structure to secure the holding plate 5, by forming a loop which adapts to the size of the structure which holds the track 4. FIGS. 9 and 10 show the clamp 7 disposed between the support arms 6 and surrounding the holding plate 5. This clamp 7 can be a plastic clamp of the standard type available on the market, or, for example, a tape with a Velcro type fastening system.

As can be seen from the same FIGS. 9 and 10, the clamp 7 is tied through a hole 8 in the holding plate 5 to form the loop and surround the structure on which the end 3 of the track 4 is held. This same plate 5 presents a channel groove 9 and a notch 10 which facilitates housing of the clamp 7 to prevent wear through friction of the clamp 7 with the surface of the plate 5.

In the described embodiment, the part 2 in the form of a claw which fastens the track 4 defines at its upper end a fork 11 for inserting by pressure inside the "U"-shaped profile 4b of the track 4. In this way, the prongs 11a, 11b of the fork 11 secure the side walls of the profile 4b preventing sideways movements of these walls.

As commented in the description of this invention, this fork 11 presents the advantage of allowing the profile 4b of the track 4 to be secured by its lower part, which makes it possible to have two adjacent tracks 4 with their profiles 4b in contact, without having empty spaces between them. This is very interesting when required to have a goods reception "bay" which maximises the points of contact of the load to be conveyed.

FIGS. 3 and 7 show a top view of the utensil 1 wherein the upper end of the part 2 can be appreciated, which is configured by way of a fork 11, and the lower end 12, which is divided into two prongs 12a, 12b.

FIG. 6 shows a side view of a variant of the utensil 1 which has been adapted to secure the exit end 3 of a goods track 4, such as for example, the final end 3 of a downwards goods ramp. In this case, as can be seen in FIG. 4, the support arms 6 that hang from the support plate 5 are configured with a predetermined length to act as a stopper of the goods on the exit end 3 of said track 4. FIG. 10 shows this variant of the utensil coupled to one end 3 of the track 4.

As one can infer from observing this FIG. 10, the goods that slide by gravity over the track 4 will butt against the support arms 6 on reaching the end of run of the track 4 where utensil 1 is, stopping their motion so that the user of the installation can collect them, without requiring any type of additional accessory as occurs in the installations of the state of the art.

Surprisingly, the claimed utensil 1 presents the advantage of allowing one end of a roller track 4 to be secured to any type of structure safely and quickly without having to use screws or equivalent elements.

Although reference has been made to a specific embodiment of the invention, it is obvious to a person skilled in the art that the described utensil 1 can be subject to numerous variations and modifications, and that all the mentioned details can be substituted with others which are technically equivalent, without abandoning the scope of protection defined by the claims below.

The invention claimed is:

1. A utensil for securing a roller track on a frame structure of a goods conveyor installation by way of said utensil, the utensil comprising:
   a fastening part configured in the form of a claw for fastening the base of one end of the roller track;
   a holding plate for leaning on the frame structure and holding said fastening part on the frame structure; and
   a clamp for securing the holding plate to the frame structure, wherein the clamp is adapted to surround the frame structure in order to secure the holding plate when the holding plate leans on the frame structure.

2. The utensil according to claim 1, wherein the track comprises a "U"-shaped profile to support conveyor rollers.

3. The utensil according to claim 1, wherein the track comprises a "U"-shaped profile to support conveyor rollers, and the fastening part comprises a fork with prongs for inserting by pressure inside the profile, the prongs of the fork being capable of fastening to side walls of one end of the "U"-shaped profile.

4. The utensil according to claim 1, wherein the holding plate comprises a hole for tying the clamp.

5. The utensil according to claim 1, wherein an upper face of the holding plate comprises a channel groove for housing the clamp on the holding plate, and a notch in an edge of the holding plate for receiving the clamp.

6. The utensil according to claim 1, wherein the fastening part hangs from the holding plate via two support arms, the clamp being adapted for passing between the arms to surround the structure and to secure the holding plate.

7. The utensil according to claim 6, wherein the support arms are configured with a predetermined length to act as a stopper for the goods at one goods exit end of the track.

8. The utensil according to claim 1, wherein the clamp is a self-adhesive tape or strip adapted to form a loop that adapts to a size of the frame structure to secure the holding plate to the frame structure.

9. The utensil, according to claim 8, wherein the tape has a hook and loop fastening system.

10. The utensil according to claim 1, wherein the clamp is a tape or strip of plastic.

11. A roller conveyor system for an installation for conveying light goods or loads by gravity comprising a plurality of cantilever roller tracks secured on a frame structure of the conveyor installation, and a plurality of utensils for securing the roller tracks to the frame structure, wherein each end of the roller tracks is secured to a crossbar of the frame structure by way of one of the utensils, wherein each utensil comprises a fastening part configured in the form of a claw for fastening one end of a roller track, a holding plate for leaning on the crossbar of the frame structure and a clamp adapted for surrounding the crossbar when the holding plate leans on the crossbar to secure the holding plate to the frame structure.

12. The roller conveyor system according to claim 11, wherein the roller tracks comprise a "U"-shaped profile to support conveyor rollers, and wherein the fastening part of each utensil comprises a fork with prongs for inserting by pressure inside the profile, the prongs of the fork being adapted to fasten to side walls of one end of the "U"-shaped profile.

13. The roller conveyor system according to claim 11, wherein each of the utensils comprises a fastening part that hangs from the holding plate via two support arms, the clamp being adapted for surrounding the crossbar when passing between the support arms to secure the holding plate.

14. The roller conveyor system according to claim 11, wherein at least one of the utensils comprises a fastening part that hangs from the holding plate via two support arms, a length of the arms being configured to act as a stopper of the goods on an exit end of one of the roller tracks.

15. The roller conveyor system according to claim 11, wherein the clamp is configured in the shape of a tape or strip.

* * * * *